Dec. 30, 1958  P. A. SIDELL  2,866,401
COFFEE MAKER
Filed Oct. 29, 1954  2 Sheets-Sheet 2
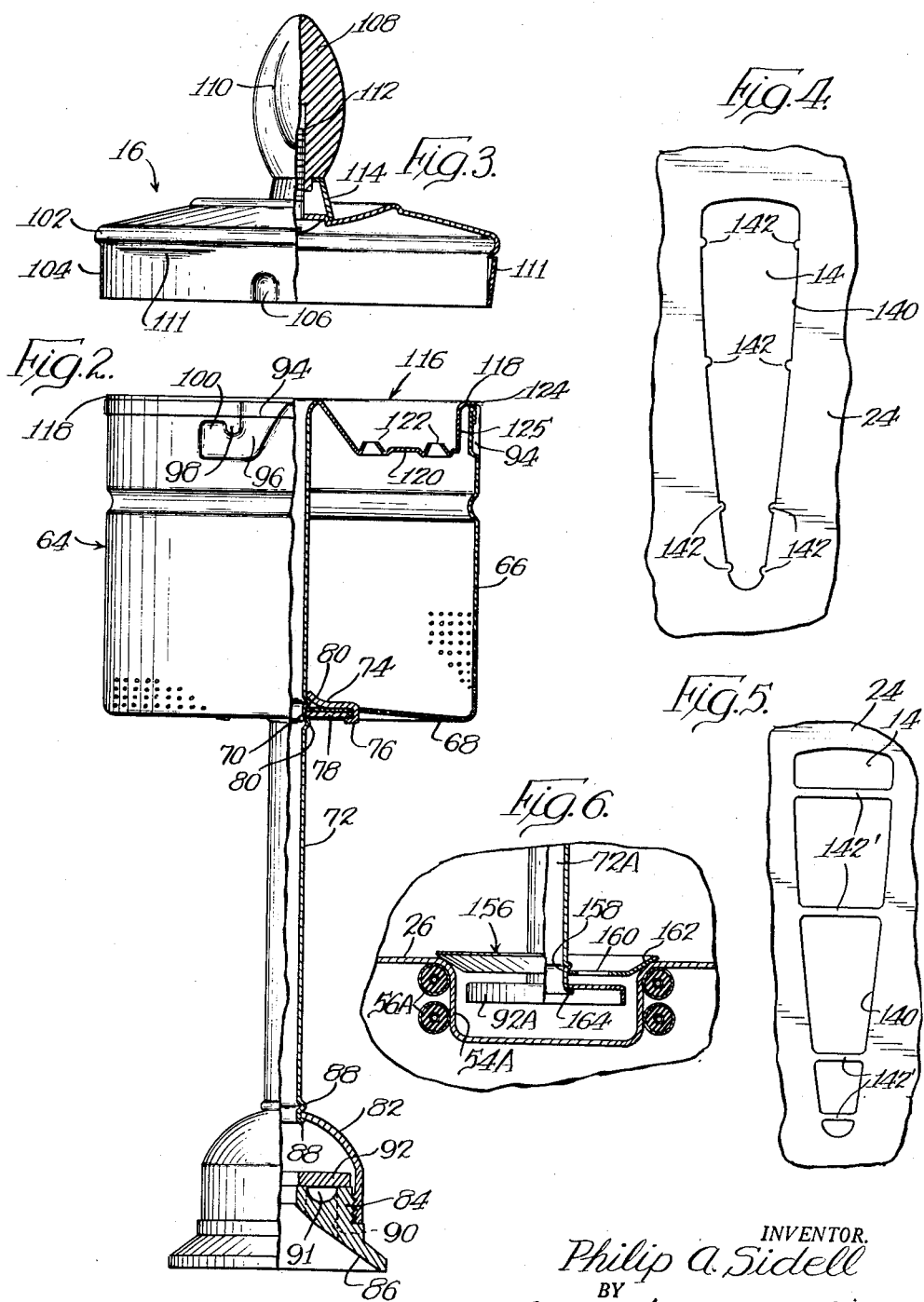
INVENTOR.
Philip A. Sidell
BY
Brown, Jackson, Boettcher & Dienner
Attys.

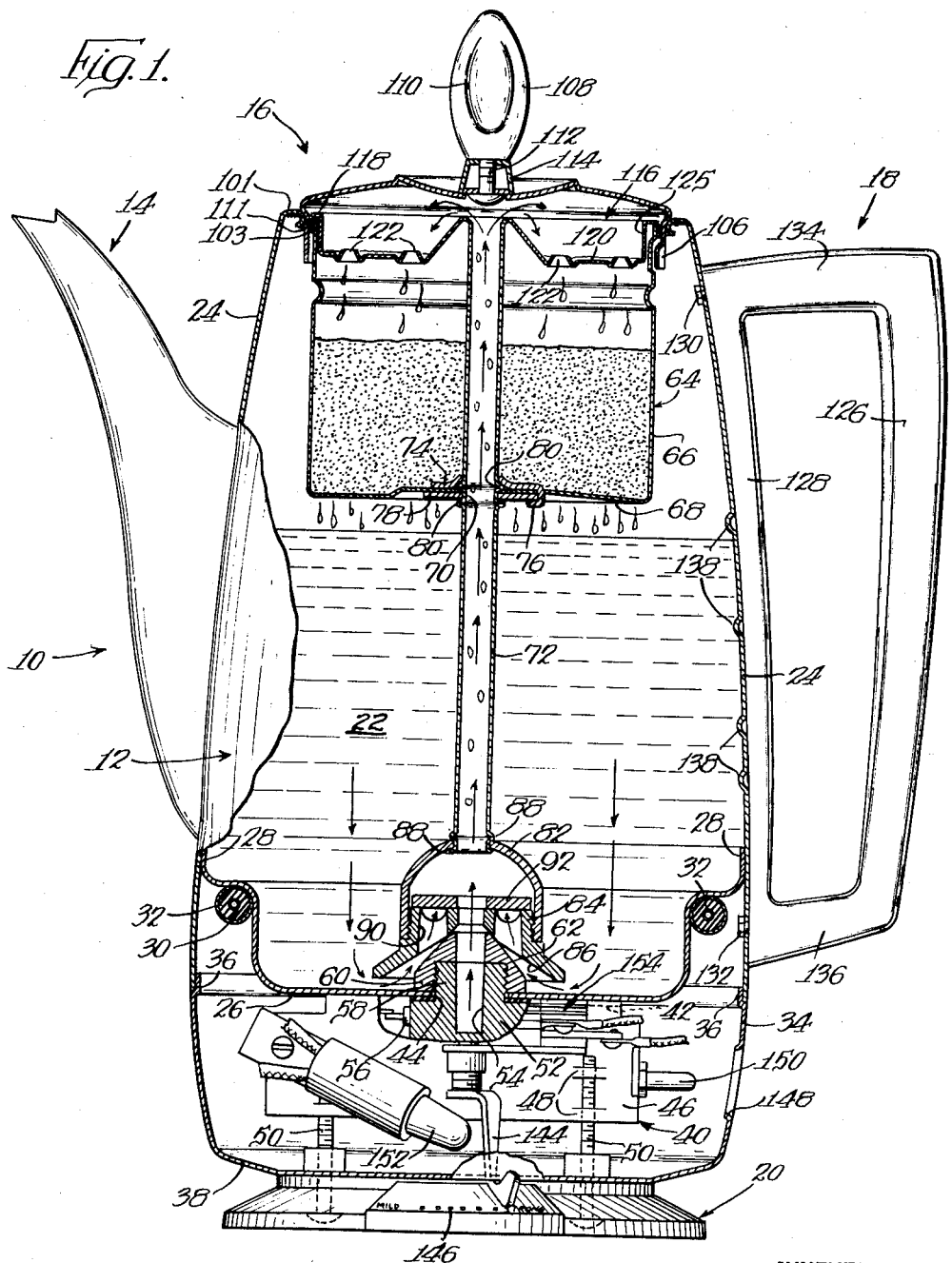

United States Patent Office 2,866,401
Patented Dec. 30, 1958

2,866,401

COFFEE MAKER

Philip A. Sidell, Chippewa Falls, Wis., assignor to National Presto Industries Inc., Eau Claire, Wis., a corporation of Wisconsin Application October 29, 1954, Serial No. 465,611

2 Claims. (Cl. 99—312)

This invention is directed to coffee making devices and is especially adapted to electrically-heated domestic drip-type coffee makers, although not limited thereto.

This coffee maker is designed for superior performance, ease of use, ease of manufacture and beauty of design. In achieving those goals, certain more specific objects of my invention, among others, are to provide an arrangement wherein the removable cover for the coffee maker is adapted to be used as a means for inserting and removing the coffee basket; centering means which assures centering of the percolating tube and basket within the coffee maker for proper percolating action; a percolating well separate from the remainder of the main fluid holding compartment with a separate heating means for said well; water circulating means associated with the percolating well to assure improved percolating action; novel water distributing means to assure uniform infusion of the grounds and to prevent their being dislodged from the basket by drip action; and novel volume indicating means.

Other objects are to provide a shape to the coffee maker and arrangement of its operating parts which assure balance during pouring and also stability while on the table or other support; insulation means for the base, to protect table surfaces, and novel insulating handles for the body and lid of the coffee maker which assure protection to the hands of the user.

Other important objects are to provide fewer structural elements than heretofore required which elements also permit of quicker assembly.

The foregoing and other objects will be apparent or become clear from the following description, when taken with the drawings, in which:

Figure 1 is a vertical elevation, partially in section, of the coffee making device of my invention;

Figure 2 is an elevational view, partially in section, showing the coffee basket, percolating tube and associated mechanism;

Figure 3 is an elevational view, partially in section, of the lid;

Figure 4 is a fragmentary view illustrating the inner surface of the vertical wall means where the spout is connected;

Figure 5 is a view similar to Figure 4 but showing a modified form of volume indicating means; and Figure 6 is a fragmentary enlarged view showing a modified form of percolating well and associated percolating tube.

Turning now to the drawings, particularly Figures 1, 2 and 3, the coffee maker is indicated generally by the reference numeral 10. It includes a body portion 12, a non-drip pouring spout 14, a lid 16, a handle 18 for manipulating the device and an insulating base 20. The fluid container portion 22 is defined by the side wall means 24 and bottom wall means 26, the latter being brazed in leak-tight relationship to the side wall means by a flange, as at 28. The bottom wall means is offset upwardly and laterally adjacent its margin to provide a curved corner 30 and the main heater 32 is secured in said corner, as by brazing. Skirt means 34 forms a downward continuation of the side wall means 24 and has at its upper end an inwardly offset flange 36 which seats inside of the side wall means 24. The skirt means 34 curves inwardly to form a bottom portion 38.

Secured to the bottom wall means 26 of the fluid container 22 is a metal bracket 40 generally U-shaped in cross section. The bight portion 42 of the bracket is secured directly to the bottom 26 of the fluid container as by brazing and it has a central aperture coinciding with the central aperture 44 in the bottom wall means 26. The downwardly directed arms or sides 46 of the bracket 40 are used for supporting various of the electrical members of the electric circuits which provide heating and light and which will be described in my co-pending application Serial No. 467,371 filed November 8, 1954. Each side 46 of the bracket also provides struck-out portions 48 which are adapted to receive a screw 50 in order that the base 20 may be secured in place. The screws 50 serve not only to secure the insulating base 20 against the bottom wall 38 of the skirt means 34 but also secure the skirt means 34 in place with respect to the side wall means 24.

Between the arms or downward flanges 46 of the U-shaped bracket 40, there is disposed means 52 for defining a well 54. Means 52 comprises an aluminum casting having disposed in it a separate electric heating element 56 which provides heat for fast active percolating action. The upper end of the casting 52 has a reduced, threaded neck portion 58 which extends through the aperture in the bight portion 42 of the bracket 40 and through the aperture 44 in the bottom wall means 26 of the fluid container. A downwardly and outwardly curved tapered nut 60 has a threaded connection with the neck 58 of the casting 52 which defines the well 54, and holds said casting in place against the under side of the bottom wall means. Suitable gasket means, not shown, is employed to render the aperture 44 fluid tight when nut 60 is drawn up on threaded neck 58. The well 54 extends below the bottom wall means 26 and the curved tapered seat 62 on nut 60 extends above said bottom wall means and provides a guide for centering of the coffee basket and percolating tube and associated mechanism, as will be described below.

The coffee basket, indicated generally by the reference numeral 64, is circular in outline and has side wall means 66 and bottom wall means 68, with about the radially outer half of said bottom wall means and the lower portion of the side wall means 66 having many fine holes through which the coffee infusion drips. The bottom wall 68 of the coffee basket 64 has a central opening 70 through which the percolating tube 72 extends. A washer 74 inside of the basket 64 curves upwardly to encircle the percolating tube 72 and has downwardly extending fingers 76 which pass through mating apertures in the bottom wall 68 of the basket. The extremities of the fingers 76 pass under and secure in place a washer 78, which also encircles the percolating tube 72. It will be observed that abutment means in the form of spaced radial flanges 80 are formed from the percolator tube itself and fit above the bottom wall 68 of the basket and below the washer 78 to hold the basket against axial displacement.

At the lower end of the percolator tube 72 there is secured wall means defining a bell-shaped chamber 82, which chamber is threaded at its lower end. The bell-shaped chamber 82 which is centrally apertured to receive the percolator tube 72 is secured to the lower end of said percolator tube by a pair of abutment means 88 formed from the tube in the form of radially extending flanges.

A centrally apertured member 84 has a threaded connection with the lower end of the bell-shaped chamber 82 and provides on its lower external surface a tapered seat 86 which is adapted to seat upon the external curved tapered surface of the nut 60. The centrally apertured member 84 has a plurality of vertical openings 90 radially outwardly from the line of contact between its tapered seat 86 and the tapered upper surface 62 of the nut 60. Apertures 90 intercommunicate at their upper ends by a circumferential channel 91 but may be closed off from the chamber 82 by a valve member in the form of washer 92, said washer, or valve, being adapted to seat, by gravity, over the openings 90. The lower periphery 89 of member 84 is provided with corrugations, or the like, to provide a convenient finger grip so that member 84 may be unthreaded from chamber 82 for cleaning purposes.

The upper margin of the coffee basket 64 is provided with one portion of interconnecting bayonet means, which cooperate between the lid 16 and the coffee basket, said portion comprising angled grooves, or recesses, 94 circumferentially disposed around the upper margin of the basket. The upper end of the recess 94 is wider than the neck portion 96 in order to permit more ready insertion of the mating bayonet member which is carried by the lid. The recess 94 extends downwardly past the neck 96 and then laterally past a projection 98 and then extends upwardly as at 100.

The lid 16 has a laterally extending flange or bead 102 which is adapted to seat on the top margin 101 of the body portion 12 which surrounds the opening 103 at the top of the coffee maker. Lid 16 also has a depending flange 104 from which there are formed at circumferentially spaced locations (matching the circumferential spacing of the recesses 94 on the coffee basket) corresponding bayonet connecting means in the form of indentations 106 in the margin of the depending flange 104. The upper surface of each indentation is curved. When the bayonet connecting means 106 are inserted in the mating recesses 96 of the coffee basket 64 and are then given a rotational movement laterally, the bayonet means 106 become located beneath the upward extensions 100 of recesses 94. If the lid is then lifted, the projections 106 rise into the upwardly extending portions 100 of the recesses 94 and cannot then be disassociated from the recesses 94 by reason of the abutments 98. When so connected together, the lid, coffee basket and percolating tube and associated structure may be inserted into the open top of the coffee maker or removed therefrom as a unit. That is particularly advantageous after the coffee making operation, when it may be desired to remove the heated coffee basket with its hot grounds. The interconnection of the lid and coffee basket also makes for convenient introduction of the coffee basket and percolator tube into the fluid container portion of the coffee maker and assists the user in locating the percolating tube 72 over the percolating well 54. Correct seating of the percolator tube over the well is also assisted by the tapered seat 86 at the lower end of the bell-shaped chamber 82 and by the curved tapered upper surface of the nut 60.

Lid 16 has an insulating handle 108 of plastic material having an ovate shape having concave finger grips 110 on opposite sides which permit ready gripping and holding of the lid, coffee basket, percolating tube and other portions when inserting and removing them from the coffee making device. The insulating handle 108 is secured to the lid 16 by means of a screw 112 which extends upwardly through a central aperture in the lid 16 and through a spacing collar, or dome, 114 into a bore in the handle 108. In addition to adding to the attractive appearance of the lid, the spacing collar 114 serves to insulate the handle 108 from any heat conducted to the lid 16.

Lid 16 has frictional gripping means 111 in its depending flange 104 whereby the lid will stay in the opening 103 at the top of the coffee making device, when said lid has been inserted into the opening. That prevents the lid's falling off when coffee is poured. The resilient means is formed by slits intermediate the bayonet means 106, with the metal at the lower side of the slit being bent outwardly a slight amount.

A novel form of water distributing means is indicated generally by the reference numeral 116. It consists of a generally disc-shaped member having a flange 118 adapted to rest on the upper margin of the coffee basket 64 and having a depressed portion 120. Water is adapted to accumulate in depressed portion 120, as it is discharged from the upper end of the percolator tube and is then diffused through apertures 122 which have their openings slightly above the bottom of the depressed portion 120. By having the upper end of the apertures 122 slightly above the depressed portion 120 of the disc 116, a slight amount of water will accumulate and cover the disc uniformly so that water will drip through all of the apertures and provide a uniform distribution of water for downward discharge through the coffee grounds. The flange 118 is recessed or cut out in order not to interfere with the indentations produced by the formation of the recesses 94 in the top margin of the coffee basket. This is indicated at 124. The vertical wall 125 of the disc 116 is set radially inwardly for the same purpose.

Handle 18 for manipulating the coffee making device is an insulating handle of plastic, or the like, having one portion 126 adapted to be gripped by the hand and having the opposite portion 128 conforming to and fitting closely against the side wall means 24. The handle 18 is secured to the side wall 24 by fastening means such as a screw 130 which passes through the side wall 124 near its top portion, above the fluid level, and screw 132 which passes through the side wall 24 at a level below the offset portion of the bottom wall 26. From this, it will be seen that the fastening means for the handle do not pass through the side wall means at a level which would permit leakage from the fluid container 22 so no special sealing precautions are required. The handle 18, while preferably shown as generally loop-shaped, could have either the upper horizontal portion 134 or the lower horizontal portion 136, which interconnect the two vertical portions 126 and 128, eliminated while still producing the same function. It is preferred, however, both for appearance and utility, to employ the loop shape. Portion 128 of the handle serves to guard the hand against contact accidentally with the side wall means when the handle 18 is being gripped by handle portion 126.

The side wall 24, where it underlies the handle portion 128, is indented to provide a series of inward projections 138 which serve as volume indicating means, visible only from the interior of the coffee making device. For example, the lower projection may represent a fluid level of three cups of coffee. The next projection, vertically, may represent four cups and the next two may represent six and eight cups, respectively. The width of the projections circumferentially is no greater than the width of the handle portion 128, with the result that the projections 138 do not show as indentations on the outer surface of the side wall 24. Hence the appearance of the outer side wall is unimpaired.

In Figure 4, a modification of the volume indicating means is shown. There, an aperture 140 through the side wall means 24 leads to the spout 14. The spout is a separate member brazed or otherwise secured to the side wall 24 and is shaped at its upper end (see Fig. 1) in such a way that the surface tension of the coffee will prevent any drops from running down the spout following a pouring operation. The side wall 24 may have a series of projections such as the projections 142 which will indicate the volume of liquid in the coffee making device. Similarly, in Figure 5, the projections on either side of the aperture 140 may be extended entirely across the aperture 140 to constitute strips 142' which will be the volume indicating means.

In using the coffee making device of my invention, the user will first decide on the number of cups of coffee desired. Let us assume that it is six cups of coffee. Either cold or hot water may then be introduced into the fluid container 22 up to the level of the third highest indicating mark 138. Either earlier, or at this stage, the user will place coffee grounds in the basket 64 corresponding to the usual number of table spoons desired for six cups of coffee and will then place the water distributing disc 116 on top of the basket and thereafter will connect the lid 16 by the interconnecting bayonet means 94—106. Then, by gripping the handle of the lid 116 between the fingers, the coffee making basket, percolating tube and associated structures may be inserted into the open end of the coffee making device. The bell-shaped chamber 82 and percolating tube 72 are easily and positively centered over the percolating well 54 by reason of the tapered surface 86 at the lower end of the chamber 82 and by reason of the curved tapered upper surface of the nut 60.

In addition to controlling the flavor of the coffee by the amount of coffee used, the user may select the flavor and strength of coffee desired by an appropriate setting of the flavor selector handle 144 which cooperates with a dial 146. Then the coffee making device is connected to a source of electric current by a standard electric cord, not shown, with the socket end of said cord inserted through the opening 148 in the skirt 34 to connect it with the electrical prongs, or plug receptacle, 150, of a known type. As soon as electrical energy is thus supplied, a pilot light 152 is lit and remains lit until the percolating action is finished. When the light goes out, it will be known that the percolating action is complete.

The electrical circuits and controls for this coffee making device are set forth in my copending application Serial No. 467,371, filed November 8, 1954, but briefly the heating action will be described as follows:

The heating element 56 for the percolating well 54 and the main heater 32 which encircles the lower portion of the fluid container 22 are both energized initially. This joint heating action brings the water up to the desired temperature quickly, said temperature being controlled by the turning of the flavor selector handle 144 which operates a thermostat 154 controlling the circuit of the main heater. When the proper temperature has been reached, the thermostat 154 opens the circuit to the main heater and thereafter the heater 56 for the percolating well 54 continues a predetermined length of time determined by a separate thermostatic control which governs it and which is not illustrated.

As the water in the container, and in the percolating well 54, is being heated by the main heater and by the percolating heater, it reaches a temperature where bubbling action occurs and rising steam carries with it water which is discharged out of the upper end of the percolating tube 72 to the water distributing disc 116, whence it passes through the apertures 122 into the coffee basket 64 and then through the grounds and out of the bottom of the coffee basket. As heated water and water vapor rise upwardly through the percolating tube, pressure above the valve, or washer 92 becomes less than that exerted on its under side by the fluid head in the container, so the valve 92 rises to permit water to flow through the apertures 90 and into chamber 82 and then down into the percolating well 54 where it will be further heated. Valve 92 will drop down again until the additional water is heated enough to rise in the tube 72. Circulation in this manner is indicated by the direction of the arrows in Figure 1. When the percolating action is finished the coffee is maintained at proper temperature by the main heater 32 which is under the control of the thermostat 154.

In Figure 6 the circular percolating well 54A is of substantially greater diameter than the well 54 of Figure 1. It may be integrally formed with the bottom wall means 26, as shown, or could be a separate member secured by a fluid-tight connection in an opening in the bottom wall means. The percolating tube 72A has a circular disk 156 connected with it adjacent its lower end at 158. The disk has apertures 160 through it and has an unapertured tapered margin 162 which is shaped so as to guide the percolating tube 72A into proper relationship with said well and to seat in and close the mouth of the well 54A.

The lower end of tube 72A carries a movable valve disk 92A which is gravity actuated to the position shown in Figure 6 where it abuts against the stop 164 at the lowermost end of tube 72A. Heating means 56A encircles the well 54A and when the temperature of water in the well becomes such that bubbling action occurs and steam is formed, valve disk 92A will be urged upwardly, guided by tube 72A until it seats against the under side of disk 156 and closes the apertures 160. After sufficient water vapor and water have risen up tube 72A so that the pressure acting on disk 92A through apertures 160 exceeds the pressure on the under surface of the disk, then the disk will move down to let additional water into the well. That water, together with such water as remains in the well, will in turn reach a temperature which again causes a closing action by valve disk 92A, as before. Such pumping action continues during the percolating operation.

While a preferred form of the invention has been illustrated and described, I do not intend to be limited thereto, except as the claims are so limited, since variations, suggested by my disclosure and within the scope of the claims, will now occur to those skilled in the art.

I claim:

1. In a coffee making device embodying a fluid container having a percolator well, an opening spaced over said well and marginal portions about said opening. the combination of a lid to cover said opening which has a depending flange to extend into said opening, said flange having peripherally extending spaced slits therein, and the material of the flange below said slits being deflected outwardly for frictionally gripping said marginal portions of the container about said opening to detachably hold the lid in place thereon, a coffee basket having its upper margin detachably secured to said depending flange, and a percolator tube extending through said basket and carried thereby, said percolator tube being adapted for location over the percolating well, and said lid, coffee basket and tube being adapted to be assembled with and removed from said device as a unit.

2. In a coffee making device according to claim 1, wherein the coffee basket has its upper margin on the inner side of said depending flange of the lid, and said upper margin and depending flange are provided with interlocking means disposed between said peripherally extending slits on the flange by which said coffee basket and lid may be detachably connected together.

References Cited in the file of this patent
UNITED STATES PATENTS

| | | |
|---|---|---|
| 523,344 | Hancock | July 24, 1894 |
| 676,763 | Nelson | June 18, 1901 |
| 745,744 | Uhalt | Dec. 1, 1903 |
| 751,565 | Savage et al. | Feb. 9, 1904 |
| 941,330 | Mittinger | Nov. 23, 1909 |
| 959,955 | Moore | May 31, 1910 |
| 1,160,684 | Ball | Nov. 16, 1915 |
| 1,251,432 | Smart et al. | Dec. 25, 1917 |
| 1,276,774 | Kuhn | Aug. 27, 1918 |
| 1,297,425 | Wentorf | Mar. 18, 1919 |
| 1,486,943 | Bates | Mar. 18, 1924 |
| 1,496,690 | Rau | June 3, 1924 |
| 1,563,155 | Buckingham | Nov. 24, 1925 |
| 1,581,871 | Roberts | Apr. 20, 1926 |

(Other references on following page)

UNITED STATES PATENTS

| | | |
|---|---|---|
| 1,666,070 | Page | Apr. 17, 1928 |
| 1,681,951 | Preston | Aug. 28, 1928 |
| 1,761,633 | Krause | June 3, 1930 |
| 1,778,926 | Wiegand | Oct. 21, 1930 |
| 2,001,160 | Smith | May 14, 1935 |
| 2,011,102 | Fisher et al. | Aug 13, 1935 |
| 2,109,363 | Williams | Feb. 22, 1938 |
| 2,152,122 | Wilcox | Mar. 28, 1939 |
| 2,192,095 | Myers | Feb. 27, 1940 |
| 2,213,723 | Smith | Sept. 3, 1940 |
| 2,283,734 | Hoffeld et al. | May 19, 1942 |
| 2,329,116 | Heilman | Sept. 7, 1943 |
| 2,388,335 | McCullough | Nov. 6, 1945 |
| 2,557,317 | Serio | June 19, 1951 |
| 2,576,432 | Wilcox | Nov. 27, 1951 |
| 2,658,134 | Kircher | Nov. 3, 1953 |
| 2,692,937 | Clark | Oct. 26, 1954 |
| 2,694,770 | Sullivan | Nov. 16, 1954 |
| 2,696,159 | Marquis | Dec. 7, 1954 |

FOREIGN PATENTS

| | | |
|---|---|---|
| 429,600 | Great Britain | June 4, 1935 |